Patented Oct. 28, 1924.

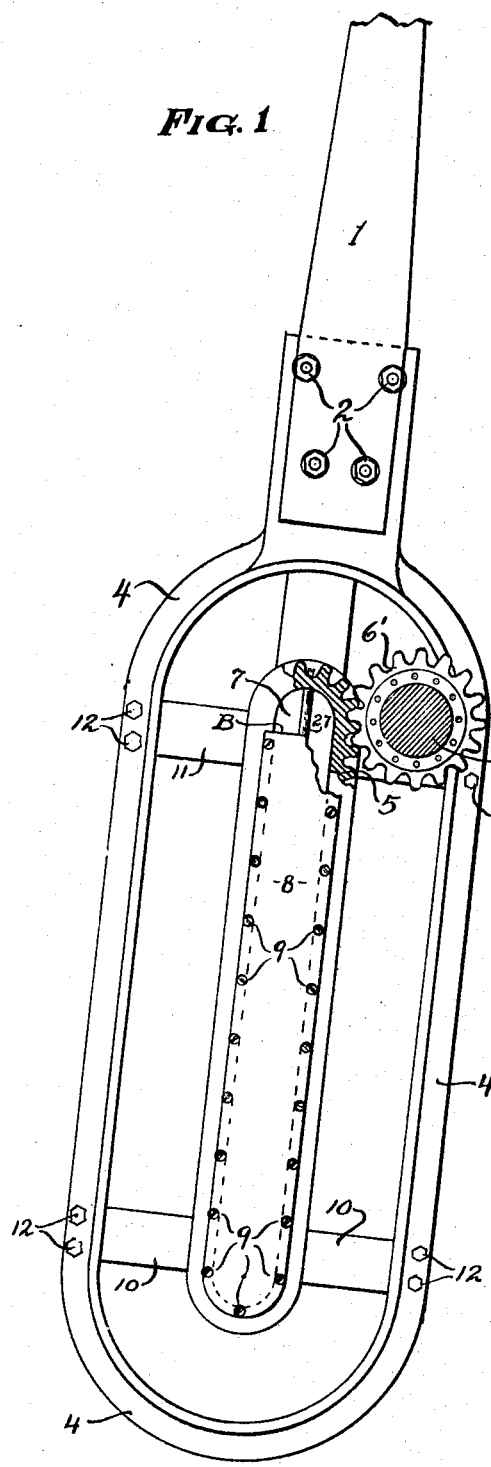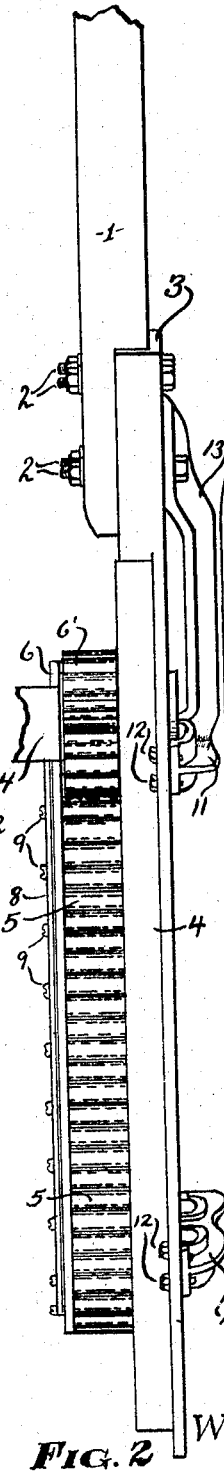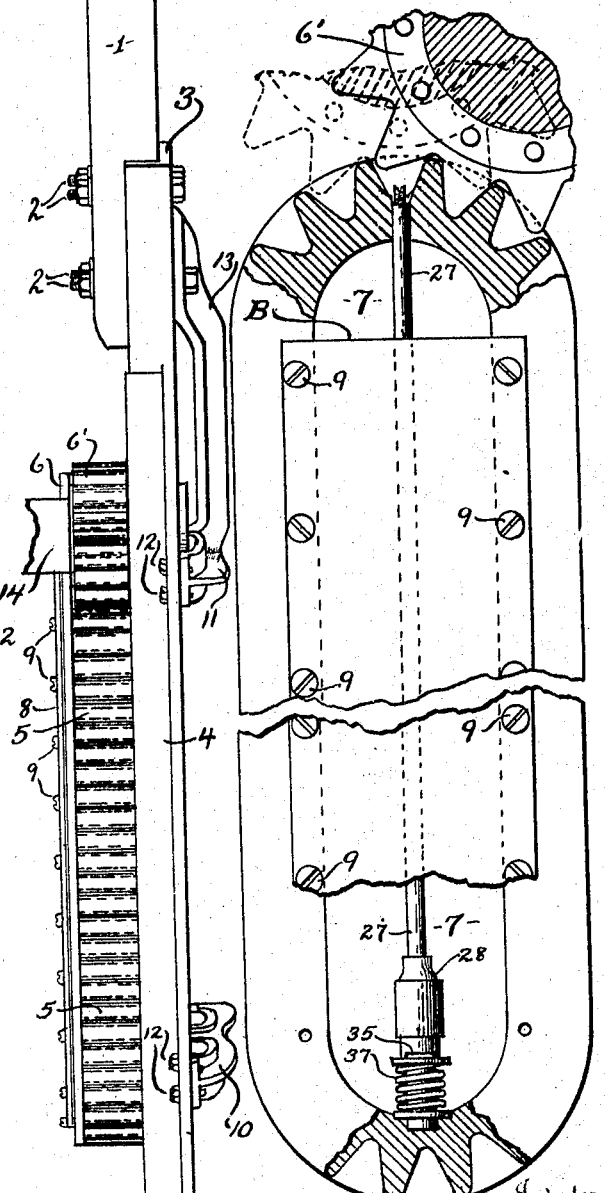

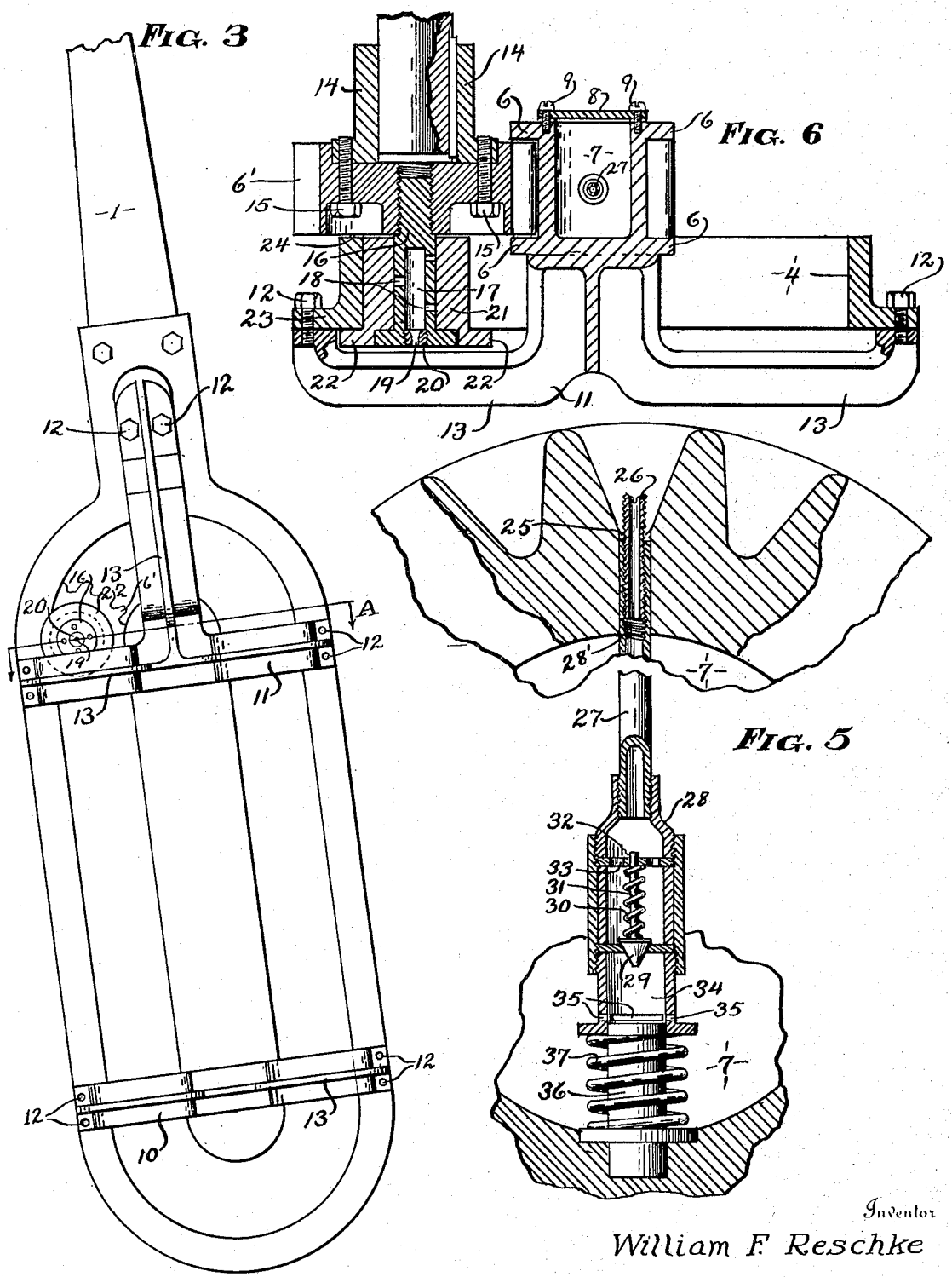

1,513,627

UNITED STATES PATENT OFFICE.

WILLIAM F. RESCHKE, OF WICHITA, KANSAS.

CONNECTING ROD FOR OIL-WELL WALKING BEAMS.

Application filed October 12, 1923. Serial No. 668,146.

*To all whom it may concern:*

Be it known that I, WILLIAM F. RESCHKE, a citizen of the United States, residing at Wichita, county of Sedgwick, and State of Kansas, have invented new and useful Improvements in Connecting Rods for Oil-Well Walking Beams, of which the following is a specification, reference being had to the following drawings, which form a part of this application.

My invention relates to improvements in connecting rod for oil well walking beams.

The objects of my invention are as follows:

First. To eliminate the usual crank for oscillating the walking beam.

Second. To decrease the power required for operating the walking beam.

Third. To provide means to avoid a sudden jar when the reverse motion of the oscillation of the beam is required.

Fourth. To provide a connecting shaft that the gearing is automatically oiled.

Fifth. To provide a gear mechanism that is easily assembled and having parts that can be replaced in the case of accident.

These and other objects will be hereinafter more fully explained, reference being had to the accompanying drawings in which;

Fig. 1 is an elevation of the rack gear constituting the power means for driving the connecting rod.

Fig. 2 is an edge view of Fig. 1.

Fig. 3 is the opposite side view as shown in Fig. 1.

Fig. 4 is an enlarged detail view of the gearing, parts being removed for convenience of illustration.

Fig. 5 is a detailed view of the oil pump functioning as the automatic oiler.

Fig. 6 is an enlarged detail sectional view taken on line A, of Fig. 3 looking in the direction of arrow.

1 is a connecting rod being firmly connected to rack gear by means of bolts 2, said rod being interposed within a channel 3 of said rack gear frame and on the opposite end of said rod is means for attaching the rod to a walking beam, such as is commonly used for drilling or pumping the oil well, same not being shown in the drawings, 4 is a looped guide, paralleling the rack gear and circumscribing the circled end of said gear 5. 5 is the rack gear having flanges 6 to close the ends of openings between the teeth of said gear, the said flanges functioning as guides for pinion 6' and also as means for confining the oil to the face of the teeth, and within said gears 5 is an oil chamber 7, depressed sufficiently to contain a pump and oil for lubricating purpose as hereinafter described. The said chamber 7 has a cover 8 securely fastened to the sides thereof, by means of screws 9, making said chamber oil tight. At the top end of said cover being removed as shown at B, for convenience of pouring oil into said chamber 7. The said rack gear 5 with its component parts, are rigidly held in position, concentric to the yoke 4 by means of brackets 10 and bracket 11, the said bracket 11 having three wings and the said wings of said brackets being curved to accommodate for the position of the pinion 6' so that in the oscillation of said rack the pinion will not contact with said brackets and the ends of said brackets are firmly attached to the loop guide by means of bolts 12 and the said brackets are reinforced by means of a web 13 which is cast integral with said brackets.

The pinion 6' is mounted on a drive shaft 14 and rigidly attached thereto by means of bolts 15 and in the hub of said pinion is attached by means of threads, a spindle 16, said spindle having an oil chamber 17 and said oil chamber is provided with orifices 18 for the purpose of dispensing oil. 19 is an oil hole for injecting oil into said oil chamber 17, the said oil hole being in a plug 20 which is screwed in the end of said oil chamber. 21 is a pulley revolvably mounted on the said spindle 16 and the said pulley having a flange 22, functioning as a guide engaging with the loop guide 23 and the opposite edge of said guide engages with the face of said pulley as shown at 24, and the said means together with the flanges 6 on said rack gear, function to keep in alignment and mesh, the said pinion and rack in its oscillation, and the said pinion 6' when passing around the top end of said rack gear, the teeth of said pinion will engage on the end of a pump pipe pressing it downward to the base of the teeth as at 25, by which movement oil is injected through the tube 26, which is a member attached to the pump pipe 27 as at 28', the object of which is to vary the length of said pipe for proper contact of the tooth on the end of said tube 26. The said pipe 27 extends downward, connecting with a chamber 28 having a check valve 29 interposed therein and the said valve being tensioned by a spring 30 coiled around a stem 31 the said stem being guided by a hole through plate 32, the said plate having apertures 33, as means for injecting the oil up through the pipe 27. 34 is a reservoir having slots 35, through which the oil will flow freely as the mechanism is submerged in the oil. 36 is a stud seated in the bottom of the oil cavity 7, said stud having mounted thereon, a spring 37 functioning as tension means for raising the check valve and all parts connected therewith to their normal position, after their engagement with a pinion tooth on member 26. The said stud is adapted to engage in the reservoir chamber 34, fitting closely therein and the said chamber being filled with oil as heretofore described, will, when forced downward by the action of the pinion teeth cause the oil in said chamber to compress, raising the valve 29 which will allow the oil to pass upward and when said valve is closed, the oil cannot return, and as the oil is forced upward through said valve, it will flow out freely at the top of tube 26, oiling the pinion gear at each revolution around the rack. It will readily be seen that when the chamber 34 is forced downward the end of stud 36 will close the slots 35, closing the way of escape for the oil and under the compression thereafter the oil will force its way through the valve 29, which is the system of pumping, automatically oiling the gear.

When my connecting rod is in operation, the upward and downward movement will be equal in speed and as the pinion rotates around the end of the rack, the speed will gradually decrease and gradually increase as it rotates to the opposite side, by which means a sudden stop or start of the motion of the walking beam is eliminated.

I also call attention that when the stroke of the walking beam is to be varied by an increase or decrease, the same is accomplished by varying the length of the rack gear, which does not require a variation of the power and by the use of my pinion and rack, the same stroke of the walking beam is attained with a lesser power.

Such modifications may be made as to proportion, and shape as lies within the scope of the appended claims, and having thus described my invention, what I claim as new and desire to secure by Letters Patent is:

1. In a connecting rod for an oil well walking beam, the combination of a loop guide, a parallel rack gear adapted for rectilinear motion, the said rack and loop being firmly connected by protruding arms from said rack, an oil cavity in said rack, an oil pump interposed within said cavity, a hollow tube extending from said pump between two teeth of said rack, a pinion connected to a power driven shaft, said pinion meshing with said rack, the teeth of said pinion compressing the said tube of said pump downward, as means for oiling the teeth of said rack and pinion for the purpose set forth and described.

2. In a connecting rod of the kind described for an oil well walking beam, an oil chamber interposed within the body of the rack gear, a pump interposed within said chamber, a hollow tube extending from said pump between two teeth of said rack, said pump having an adjustable oil dispensing tube, a pipe connecting said tube to a check valve chamber, a reservoir placed adjacent to said check valve, a stud engaging in said oil chamber for compressing and forcing said oil through said valve, a spring engaging with the end of said stud and the bottom of said oil cavity, as tensioning means to allow said oil to collect in said chamber for the purpose set forth and described.

3. In a connecting rod for a walking beam for an oil well, a reciprocating rectilinear gear of the kind described attached to said rod, and the opposite end of said rod being attached to said walking beam, a rack and loop guide, a pinion, said pinion being in mesh with said rack, a spindle in the hub of said pinion, said spindle being hollow for oil dispensing means, a pulley mounted on said spindle, said pulley having a flange and the face of said pulley engaging with a loop guide functioning as guiding means to hold said pulley in mesh and alignment during the reciprocation of said rack, and means for oiling said pulley and pinion.

WILLIAM F. RESCHKE